(12) United States Patent
Ricketts

(10) Patent No.: US 7,346,594 B2
(45) Date of Patent: Mar. 18, 2008

(54) CLASSIFICATION METHOD AND SYSTEM FOR SMALL COLLECTIONS OF HIGH-VALUE ENTITIES

(75) Inventor: John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/252,944

(22) Filed: Oct. 18, 2005

(65) Prior Publication Data
US 2007/0112697 A1    May 17, 2007

(51) Int. Cl.
*G06F 15/18* (2006.01)

(52) U.S. Cl. ........................................................ 706/12
(58) Field of Classification Search .................. 706/12
See application file for complete search history.

(56) References Cited

OTHER PUBLICATIONS

Derrick A. Bennett "How can I deal with missing data in my study?" Australian and New Zealand Journal of Public Health vol. 25 No. 5 2001.*

* cited by examiner

*Primary Examiner*—David Vincent
*Assistant Examiner*—Lut Wong
(74) *Attorney, Agent, or Firm*—John R. Pivnichny; Dillon & Yudell LLP

(57) ABSTRACT

A method and system for classifying small collections of high value entities with missing data. The invention includes: collecting measurement variables for a set of entity cases for which classifications are known; calibrating standard weights for each measurement variable based on historical data; computing compensating weights for each entity case that has missing data, computing case scores for each of one or more dimensions as a sum-product of compensating weights and variables associated with each dimension; executing an iterative process that finds a specific combination of compensation weights that best classify the entity cases in terms of distinct scores; and applying a resulting model, which is determined by the specific combination of compensation weights, to classify other entity cases for which the classifications are unknown.

5 Claims, 16 Drawing Sheets

|  | D1 | | | | | D2 | | | | |
|---|---|---|---|---|---|---|---|---|---|---|
|  | Q1 | Q2 | Q3 | Q4 | Q5 | Q6 | Q7 | Q8 | Q9 | Q10 |
| S1 | | | | | | | | | | |
| S2 | | | | | | | | | | |
| S3 | | | | | | | | | | |

200

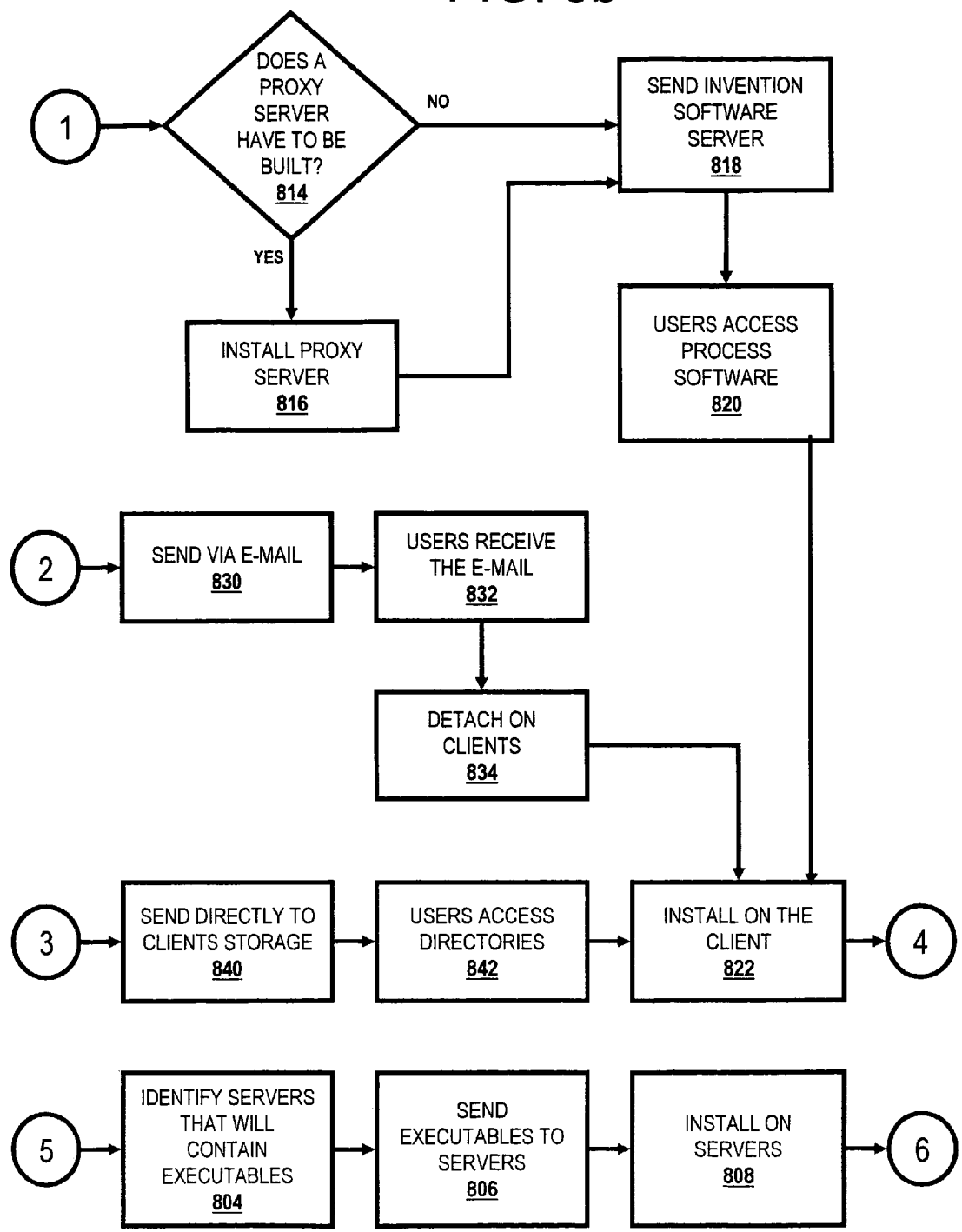

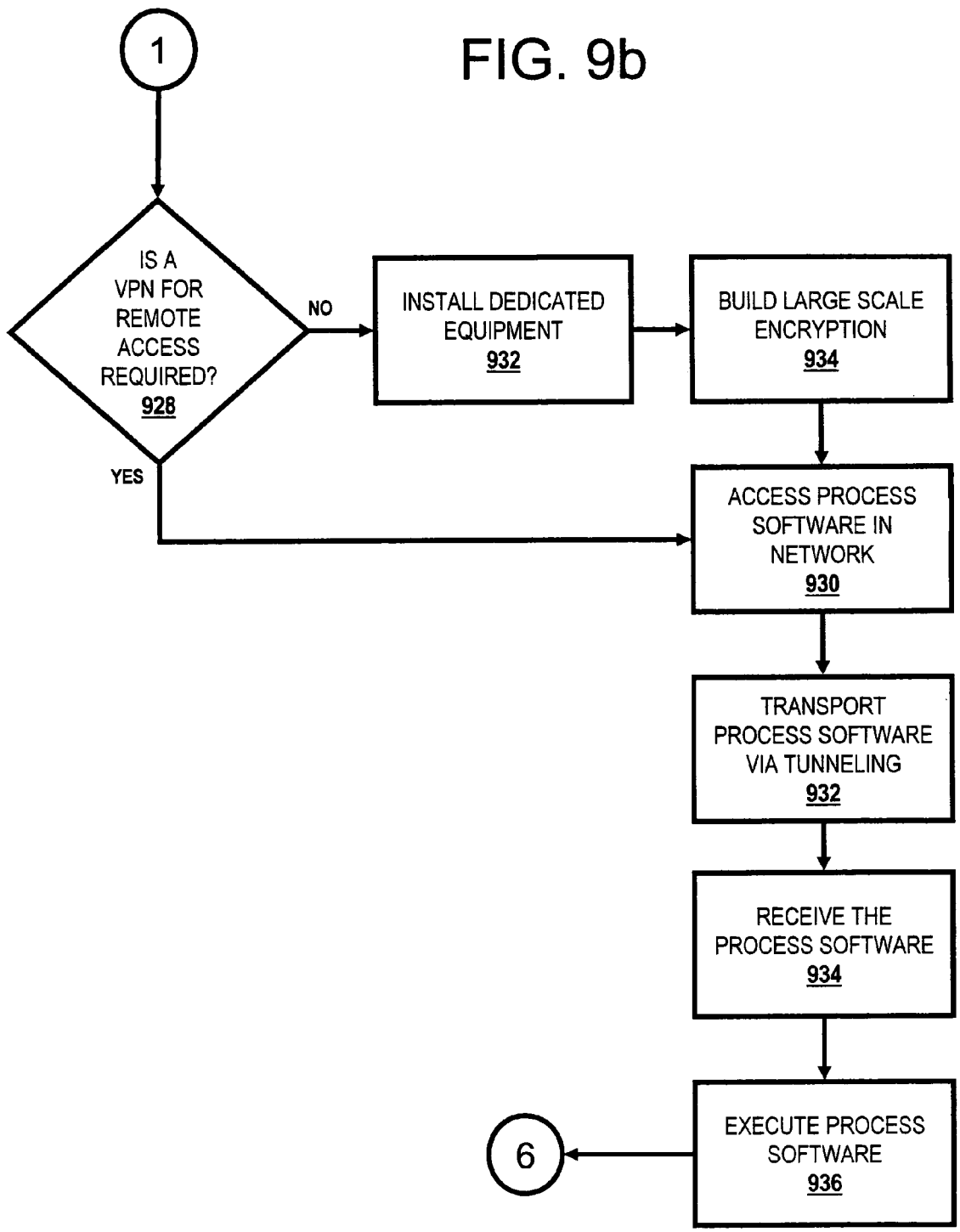

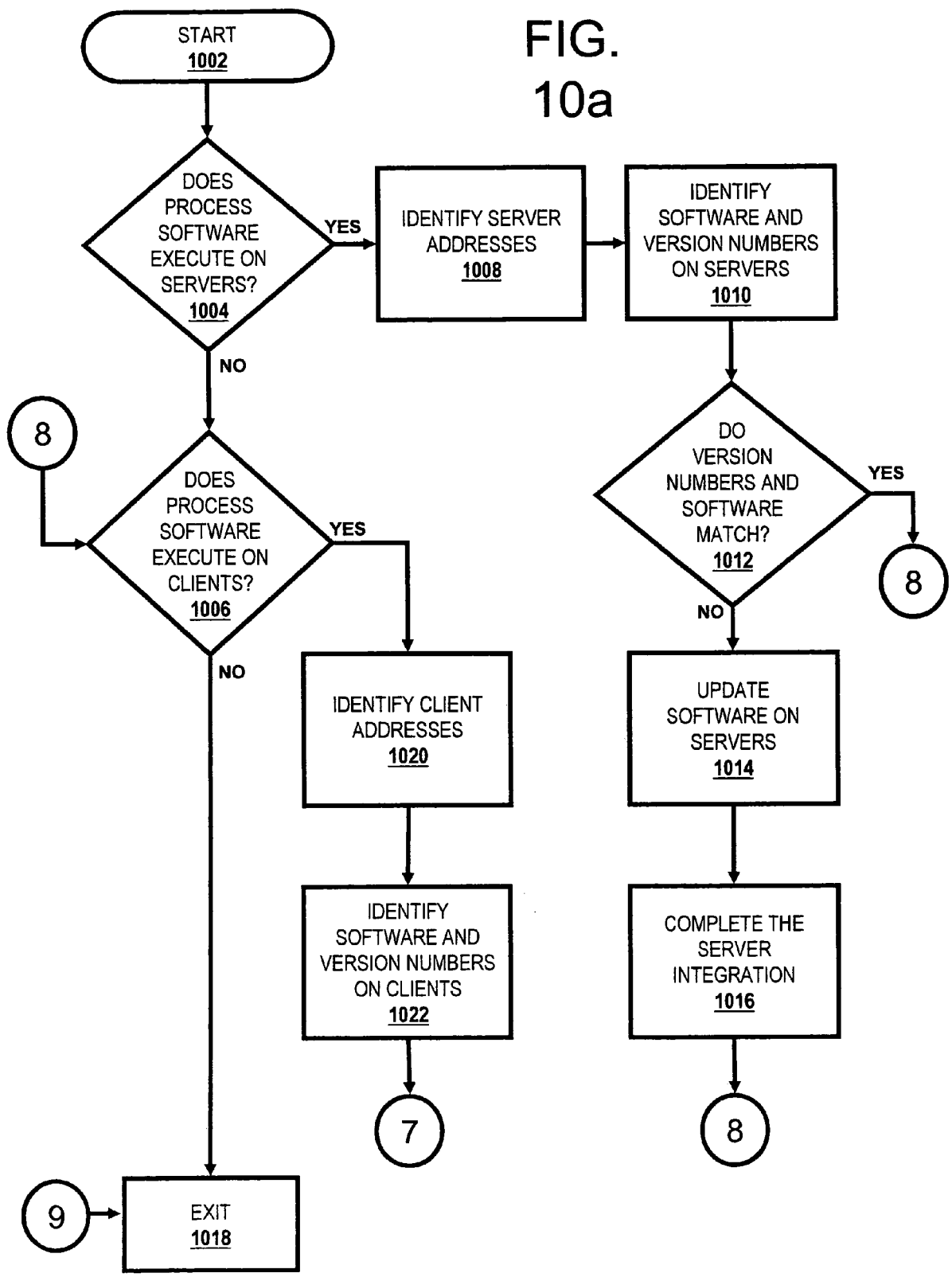

CLASSIFICATION METHOD AND SYSTEM FOR SMALL COLLECTIONS OF HIGH-VALUE ENTITIES

BACKGROUND OF THE INVENTION

1. Technical Field

The present invention relates in general to the field of computers and similar technology systems, and in particular to software utilized by such systems to implement methods and processes. Still more particularly, the present invention relates to a computer-implementable method and system for classifying small collections of high-value entities with missing data.

2. Description of the Related Art

Classification is a problem with many solutions in statistics and neural networks. However, both solution areas are sensitive to missing data. When data is missing, common solutions are to discard entire cases, discard pairs of values, or replace missing values with a surrogate, such as the mean or median. Yet for a small collection, discarding cases or pairs is undesirable because each case accounts for a high proportion of the collection, and missing value substitution is ineffective because means and medians may not be sufficiently representative of an individual, high-value case.

Nevertheless, as the value of individual entities increases to high levels, the benefits of classification may be sufficient to compel a solution, even for small collections with missing data. This occurs in fields where decisions must be made even if the available information is meager and "no action" can be a decision with ramifications as severe as the wrong action. For example, if a couple dozen entities could each result in hundreds of millions of dollars in profit or loss, or defection of an entire customer segment, even approximate classification can be a powerful aid to decision making because the decisions might otherwise be based entirely on intuition.

SUMMARY OF THE INVENTION

Recognizing the need for a way to classify small collections of high value entities with missing data, the present invention presents a method, system and computer-usable medium based on a method that includes: collecting measurement variables for a set of entity cases for which classifications are known; calibrating standard weights for each measurement variable based on historical data; computing compensating weights for each entity case that has missing data, computing case scores for each of one or more dimensions as a sum-product of compensating weights and variables associated with each dimension; executing an iterative process that finds a specific combination of compensation weights that best classify the entity cases in terms of distinct scores; and applying a resulting model, which is determined by the specific combination of compensation weights, to classify other entity cases for which the classifications are unknown.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 8a-b show a flow-chart of steps taken to deploy software capable of executing the steps shown and described in FIGS. 1-5;

FIGS. 9a-c show a flow-chart of steps taken to deploy in a Virtual Private Network (VPN) software that is capable of executing the steps shown and described in FIGS. 1-5;

FIGS. 10a-b show a flow-chart showing steps taken to integrate into an computer system software that is capable of executing the steps shown and described in FIGS. 1-5.

DETAILED DESCRIPTION OF THE PREFERRED EMBODIMENT

This invention presents a method and system for classifying small collections of high-value entities with missing data. Once such classifications are made, then new entities can be evaluated based on how they align with the previously classified high-value entities.

Classification means to assign each entity into a category based on properties in common with other members of that category and in contrast with members of other categories. One purpose of such classification is to identify which properties define each category in order to [1] select appropriate actions for entities based on their category, [2] move an entity from one category to another, or [3] affect the properties of an entire category. Another purpose is simply to predict the category for future entities based on the properties they have in common with past or current members.

Small collections are sets of entities too small for statistical methods or neural networks, which generally require relatively large samples, often consisting of hundreds or thousands of cases. A small collection can comprise just a sample or the entire population of entities—and it may number fewer than 30 cases.

High-value entities are objects whose individual worth is substantial enough to justify classification, even if the total number of objects is too small to attain statistical significance or neural network convergence. Examples include ultra-large-scale or unique projects, customer segments, product brands, market geographies, service types, legislation, or regulations.

Missing data is variables for which no values are known for particular entities. Data may be missing because it could not be gathered for some entities or because a property is not applicable to particular entities. That is, some attributes may be present only during certain stages of the entities' life cycle. For example, mortgage loans generally apply to adults, not teenagers. On the other hand teenagers spend substantial amounts, so their influence on economic matters cannot be ignored.

Figure 1:
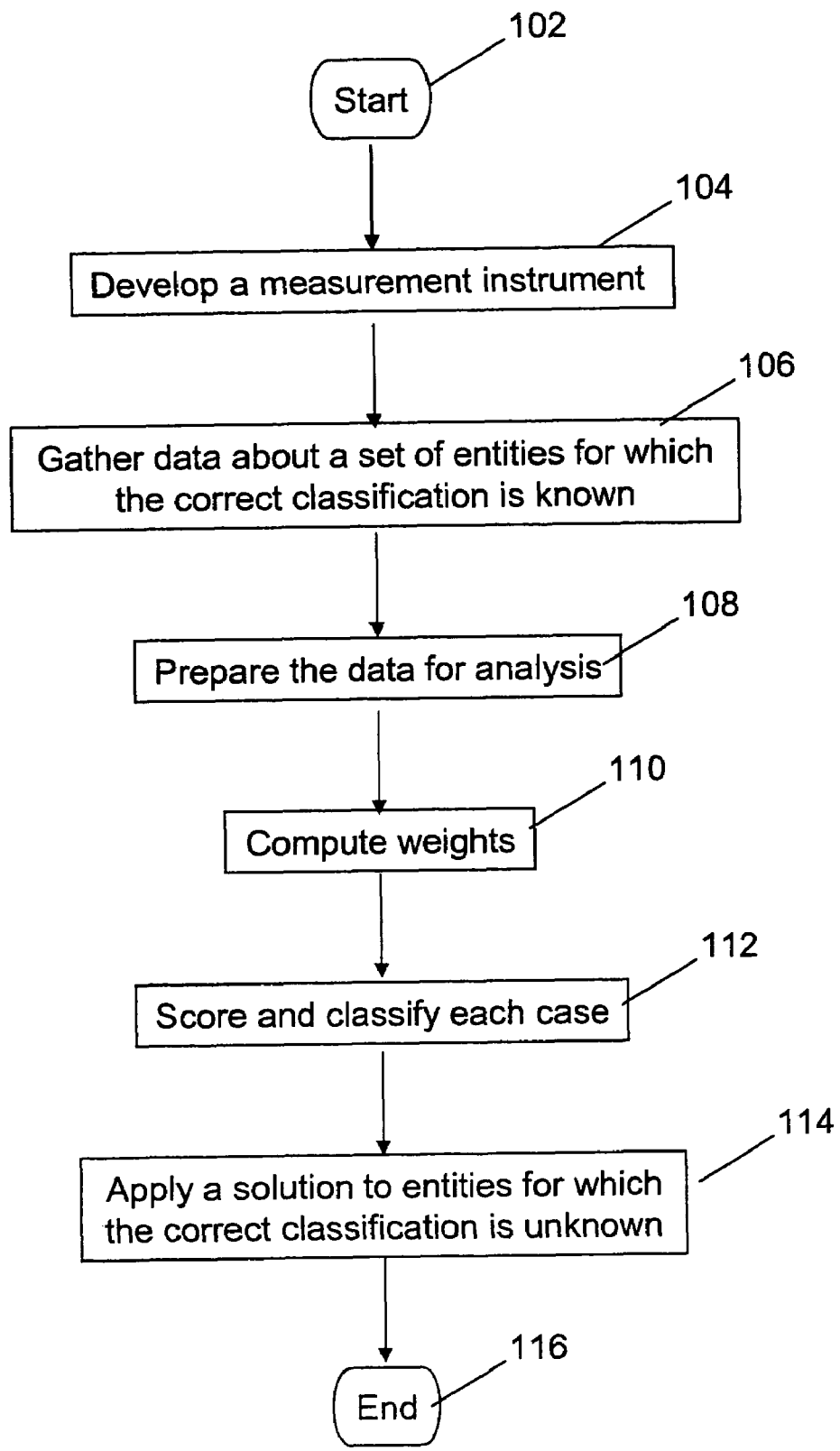
FIG. 1 is a flow-chart of exemplary steps taken to classify small collections of high-value entities.

The basic steps of the present invention are depicted in FIG. 1. After initiator block 102, the following steps exemplifying the invention are:

Develop a measurement instrument (e.g., a form or database) which gathers data about the relevant attributes of entities to be classified (block 104). Those attributes must include [a] one dependent variable comprising the set of relevant categories and [b] more than one independent variable to be used for classification. Related independent variables can optionally be organized into multiple dimensions that will each be weighted separately.

Gather data about a set of entities for which the correct classification is known (block 106). The independent variables can be facts or opinions (i.e., objective or subjective), but they must be quantifiable on interval or ratio measurement scales. An interval scale allows quantification and comparison of differences between variables. A ratio scale does likewise, except it also has a zero point. Some values may be missing for independent variables, but not the dependent variable.

Prepare the data for analysis (block 108) by [a] validating the values and correcting errors, [b] converting non-numeric values, such as "very high," to numeric values because they will be weighted in a later step, [c] inverting scales as needed so that increases in each independent variable lead to increases in the dependent variable, [d] rescaling variables so that their means and variance are at least approximately the same, and [e] transforming values to reduce severe non-normality, if present.

Compute weights (block 110) for each independent variable such that the independent variables correctly classify as many cases as possible. The computation creates standard weights applicable to all cases, then normalized weights for every case where data is missing. Normalization means, on a case-by-case basis, the weights for missing values are set to zero while the weights for non-missing values are increased. Thus, missing values do not require cases or pairs of values to be discarded (unless all of the independent variables comprising a dimension are missing). And no statistics, such as the mean or median, are substituted for missing values. This ensures that each case is represented only by data actually gathered for that case. The normalized weights are therefore also called compensating weights because they compensate for missing data.

Score and classify each case (block 112) by [a] multiplying each independent variable by its standard or compensating weight, [b] summing the products into a score for each dimension, and [c] determining the zones (combination of scores) that distinguish categories. To the degree that the weights successfully classify cases, cases known to be members of a particular category will have similar scores, and those scores will be different from scores for cases in other categories. Thus, if the scores are plotted on a chart, each category is comprised of points that fall within a relatively distinct zone from other categories. The better the classification, the more distinct the separation of cases into zones. Weights with the largest absolute values then identify the independent variables that contribute most to classification. This process for establishing weights is known as calibration.

Apply a solution to entities for which the correct classification is unknown (block 114) by [a] preparing data for analysis, [b] normalizing the weights on a case-by-case basis for missing values, [c] computing scores for each dimension, and [d] inferring the category for each case from the zone where it falls. Newly classified entities can then be viewed in relation to entities for which the correct classification is known. If the solution effectively classifies entities, the newly classified ones will be clearly separated into distinct classes. The process thus ends at terminator block 116.

Each specific implementation of this invention consists of a model that classifies entities. And the variables and weights will likely differ for each collection of entities.

This invention can classify collections of high-value entities which are too small or have too much missing data for statistical methods or neural networks. It is applicable whenever the value of the entities is high enough to compel classification, despite having only a small collection with missing data.

Of course, no classification method, including this one, will succeed if the data contains no classes to be discovered. But this method can work under conditions that preclude traditional classification methods. For example, if a small collection contains an entire population of entities, there is no way to increase the sample size as required by statistics or neural networks. Likewise, if a small collection contains entities with vastly different properties, substituting a group attribute, such as the mean, for missing data is inappropriate because it is unlikely that the mean is a sufficiently accurate substitute.

This invention requires a relatively small number of steps to find a local optimum. Even though each step may require thousands of calculations, the method is straightforward enough that it can calibrate weights much faster than most neural networks can be trained. Additional detail of the steps described in FIG. 1 is now presented below.

Development of Measurement Instrument

The number of independent variables included in a model typically must strike a balance between having enough to adequately classify cases while not having so many that the difficulty of data collection further limits the number of cases in the collection. Good classification results have been achieved, for example, with as few as twenty carefully selected questions split into two dimensions.

Although independent variables must eventually be converted to numeric values on interval or ratio scales, the measurement instrument does not have to collect them in numeric form. For example, some questions on the instrument may be answered on a non-numeric scale, such as Very High to Very Low or Very Satisfied to Very Dissatisfied. The data preparation step, discussed below, later converts non-numeric to numeric values.

As noted previously, independent variables can optionally be organized into dimensions, where each dimension is a set of related variables for which a separate set of weights will be computed. The association of variables to dimensions can be defined by theory, convention, or judgment. It may be appropriate for dimensions to be apparent to the respondent (i.e., related questions may be grouped together on the form), but this is not required by the computational method.

Unlike independent variables, which must be measured on interval or ratio scales, the dependent variable can be measured on interval, ratio, ordinal, or nominal scales. A nominal scale assigns a number to each case, but there is no inherent ordering to the values (i.e., the numbers are like names). An ordinal scale assigns numbers that are ordered: A higher value indicates that the entity has more of whatever property is being measured, but the numbers do not quantify how much more. When the dependent variable is ordinal or nominal, however, the problem may become non-smooth. "Non-smooth" means the dependent variable is discontinuous, so the calculations needed to solve for an optimal set of weights are much more difficult.

In addition to independent and dependent variables, which participate in the calculations, the measurement instrument may also capture demographic variables, which are additional attributes of the entities. Demographics may be used to develop different sets of weights for subsets of entities in order to improve classification. For example, if the objective is to predict whether entities in various customer segments will buy a particular product, it may be necessary to develop different sets of weights for some segments because they have different needs and/or preferences.

Figure 2:
FIG. 2 is a chart of previous sets of entities classified according to different domains.

FIG. 2 illustrates a matrix 200 that shows questions (Q1-Q10) as columns, dimensions (D1, D2) as groups of columns, and sets (S1-S3) as rows. Each cell in matrix 200 is populated with a weight (not shown), and constraints on the weights are applied within dimension within set.

For example, consider for exemplary purposes that previously built hotels, represented by S1-S3, are being qualified according to an embodiment of the present invention. D1 may be the dimension of whether the hotel is profitable, and D2 may be whether the hotel is located on an U.S. interstate highway.

Within each dimension are questions (Q1-Q5 for D1; Q6-Q10 for D2), which are preferably in Yes/No format. Questions under D1 may be: Q1—Is the hotel operating at profit margin that is greater than 10%?; Q2—Are more than 20 conventions held in the hotel per year?; Q3-Q5 etc. Questions under D2 may be: Q6—Is the hotel on an interstate highway more than 50 miles from a major urban area?; Q7—Is the hotel on an interstate highway within 10 miles of an urban area?; Q8-Q10 etc.

Each question is presented with a score and weight as described herein. Each row, column or row/column subset may be summed, averaged, etc. to provide additional analytical granularity, if so desired.

Gathering Data about Entities

Although this invention tolerates missing data, that does not mean data collection can be careless. The only legitimate reasons for data to be missing are it is unknown or impractical to collect.

Strictly speaking, it may take only one valid value per dimension for this invention to compute a score for that dimension. However, the fewer values there are for questions with large weights prior to normalization, the poorer the resulting classification will be.

Therefore, the implementer of a specific model based on this invention may choose to specify that some variables cannot be missing. This should be done selectively, however, because this may exclude some cases that otherwise might be included. A much less restrictive solution is to specify that at least one variable with weights beyond a threshold must have a valid value.

Preparing Data for Analysis

When data is converted from non-numeric to numeric values, the result may be a polytomous scale (i.e., one having relatively few unique values actually present in the data). However, if there are multiple questions scaled this way, and at least some have different values, the resulting scores will have more than just a few unique values. Thus, polytomous scales are not necessarily a problem.

Inverting scales is done so that increases in independent variables lead to increases in the dependent variable. When there are multiple sets of weights, however, inverting the scale may not establish this relationship for all sets simultaneously. If so, when the weights are computed (see below), it may be necessary to allow negative weights.

Rescaling variables so that their means and variances are at least approximately the same is done so that no variable dominates the scoring as an accident of its original scaling. For example, if variable #1 is measured on a scale of one to five with mean of three and variable #2 is measured on a scale of zero to $100 million with mean of $20 million, #2 would thoroughly dominate a score computed from these raw variables. However, dividing #1 by three and #2 by $20 million would rescale these variables so that they both have means of one, and #2 would no longer dominate.

Though variables can be standardized so that they all have exactly the same means and variances (e.g., Z-values have mean of zero and variance of one), this approach can lead to unstable scores when more cases are added later. That is, when new cases are added, the standardized values of old cases may change even though the entities they represent have not changed at all. Such instability is undesirable in many decision-making contexts because it adds noise to an already noisy situation.

Extreme cases in a non-normal distribution may have too much effect on a score computed from several variables. Thus, values may need to be transformed to reduce severe non-normality. For example, in the example above, just a few instances of variable #2 approaching $100 million would have much more effect than many instances below the mean. Therefore, prior to rescaling #2, a square root transformation could be applied to reduce its positive skew. This would also affect its mean, so a different rescaling factor would be required, but transforming and rescaling may both be advisable, depending on the actual distribution of each variable.

Computing Weights

When constraints are specified for weights, they govern how a model tolerates missing values. Here are some examples:

"Each weight must be between 0.0 and 1.0, inclusive, with the sum of all weights within each dimension within each set equal to 1.0." These constraints assume that no independent variable has an inverse relationship with the dependent variable. They also permit just one variable to carry all the weight, which would prevent the model from tolerating missing values on that variable and also prevent the model from using valid values on any other variables. In practice, a handful of variables would likely share most of the weight, but this could still leave the majority of variables with little or no weight.

"Each weight must be between −0.30 and −0.01 or between 0.01 and 0.30, inclusive, with the sum of all weights within each dimension within each set equal to 1.0." These constraints allow for inverse relationships, yet ensure that every variable gets at least some weight, and no single variable gets a majority of the remaining weight. It therefore tolerates missing values on any variable.

Such constraints always apply to standard weights and also apply to compensating weights unless missing values force a constraint to be violated. For example, for a specific case with missing values, if the number of variables with valid values were extremely small, it might be necessary to allow some compensating weights to exceed the maximum constraint in order to satisfy the constraint that all the weights to sum to 1.0. In practice, however, this rarely if ever occurs.

Optimization is the process of determining the specific combination of weights that best classifies the entities. This invention requires that every time the standard weights change, each case's compensating weights also change accordingly because each case's scores are computed from those compensating weights. Whether a global optimum can be computed depends on the specific variables and constraints, but in practice, only local optima may be computable in reasonable time. Thus, the starting point can be critical since it determines which local optimum will be found.

For an initial solution, the model typically starts with uniform weights, though model builders can specify whatever starting weights they want. For subsequent solutions, the model often starts from a previous solution. If the problem is smooth, familiar optimization algorithms, such method of steepest ascent, will work. Alternatively, a search algorithm can handle non-smooth problems. That search may be made more efficient by adjusting the step size and direction dynamically to accelerate through smooth regions and decelerate through non-smooth regions.

Suppressor variables may exist when the optimal solution assigns non-trivial weights to variables that do not correlate with the dependent variable. They are called suppressors because they appear to suppress error variance in non-suppressor variables, which do correlate with the dependent variable.

If a case has valid values for suppressors, yet missing values for non-suppressors, its compensating weights can produce an anomalous score (i.e., one that is radically different from what it would have been if at least some of the non-suppressors had valid values). Suppressor deactivation is therefore the process of forcing suppressors to zero when the corresponding non-suppressors are missing. This leaves the remaining non-suppressors able to generate a reasonable score.

Scoring

Scores are computed for each case by multiplying each independent variable with a valid value by its compensating weight and summing these products within each dimension of a model. If the independent variables have approximately the same means and variance, the scores will, too.

When the scores for each dimension are compatible (i.e., have approximately the same means and variances), scores for models with multiple dimensions can easily be combined into an overall score. Three frequently used methods are Euclidean distance (geometric distance in multidimensional space), Chebychev distance (maximum score on any dimension), and Manhattan distance (sum of scores on all dimensions).

When multiple sets of weights are needed to correctly classify cases with different values on a demographic variable, any independent variable may be weighted differently across sets. Thus, if that demographic variable changes for some cases (e.g., products, projects, markets, and segments all tend to move through life cycles), the scores for those cases may change dramatically to reflect their membership in a different demographic.

Classifying Cases

Although cases can be classified by identifying the range of scores on each individual dimension that distinguishes cases with different values on the dependent variable, the overall score may provide a more concise method for classifying cases. That is, if the model classifies cases well, cases with different values on the dependent variable tend to have different overall scores and therefore fall into separate zones when plotted on a chart. Within zones, however, cases do not necessarily form clusters. That is, the spread of cases within a zone may distinguish cases that are stronger on particular dimensions.

Figure 3:
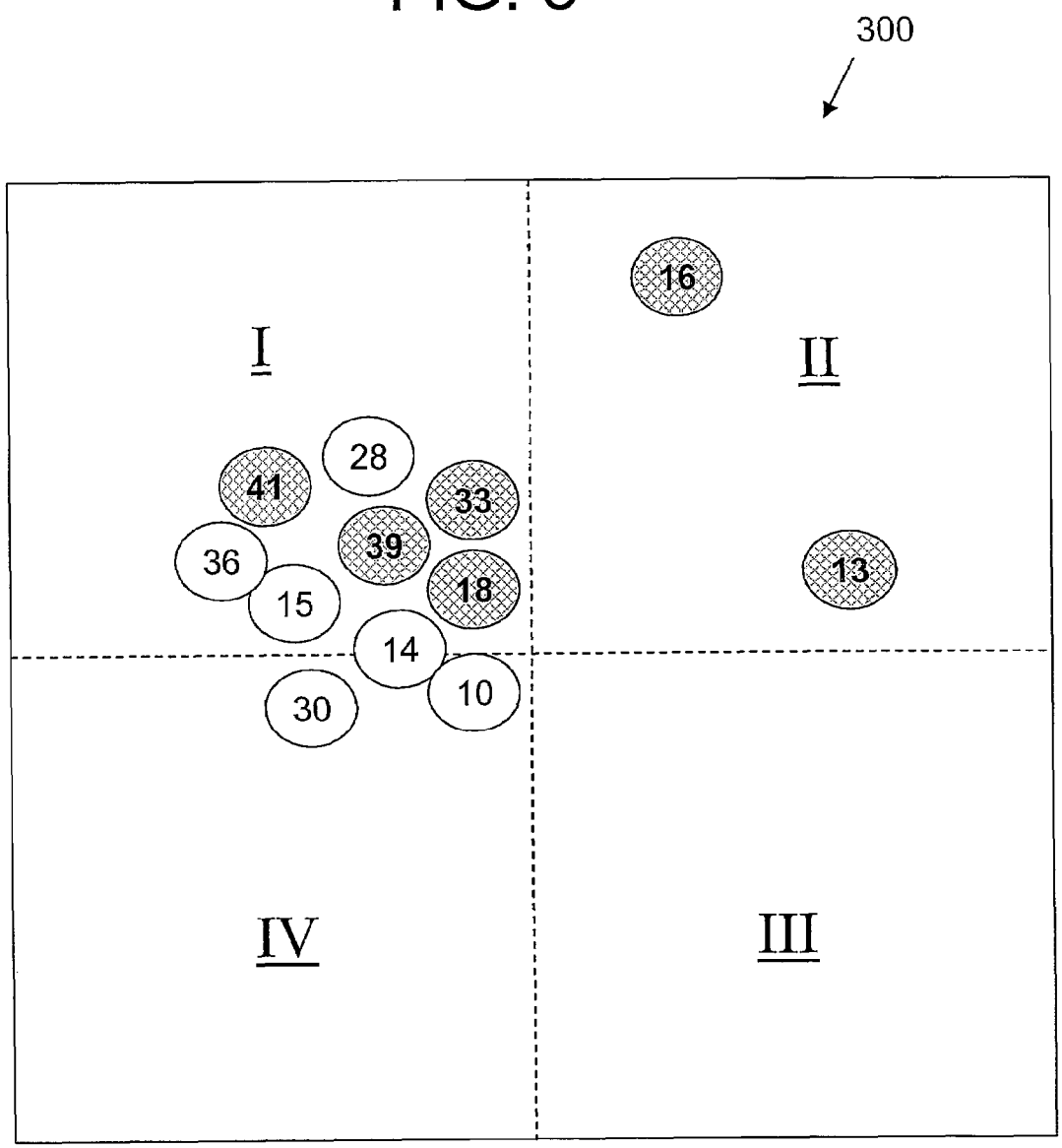
FIG. 3 is an uncalibrated model of a chart showing just a few high-valued entities.

FIG. 3 illustrates an uncalibrated model 300 with just a dozen high-valued entities. Each bubble represents one case. The size of each bubble represents one of the entities' attributes, such as number of consumers in a market segment or its total revenue dollars. The numbering of each bubble just represents a project number, case number, etc. The shading of each bubble represents the dependent variable, which in this example has just two values but in actual models may have multiple values. The center of each bubble marks its score on the horizontal and vertical axes. The horizontal and vertical axes may represent any measured parameter. For example, the horizontal axes may be how desirable a project is to a contractor (with 0.0 being the lease desirable and 2.0 being the most desirable), while the vertical axes may be how eager a customer is to use the services of the contractor (with 0.0 being "not interested" and 2.0 being "extremely interested"). Thus, those bubbles in Quadrant II represent those historical cases in which both the contractor and customer were very interested in working together (for profitability and other reasons), while Quadrant IV would contain any bubbles in which there was little interest from either party.

Whereas bubbles #13 and #16 are distinct, the remaining bubbles, including those of both shades, are clustered together. Centroids (points defined by the means on each dimension for each group) are marked as points A and B. Since the bubbles themselves are clustered, the centroids are not well separated either. Thus, this uncalibrated model does a poor job of classifying these entities.

Figure 4:
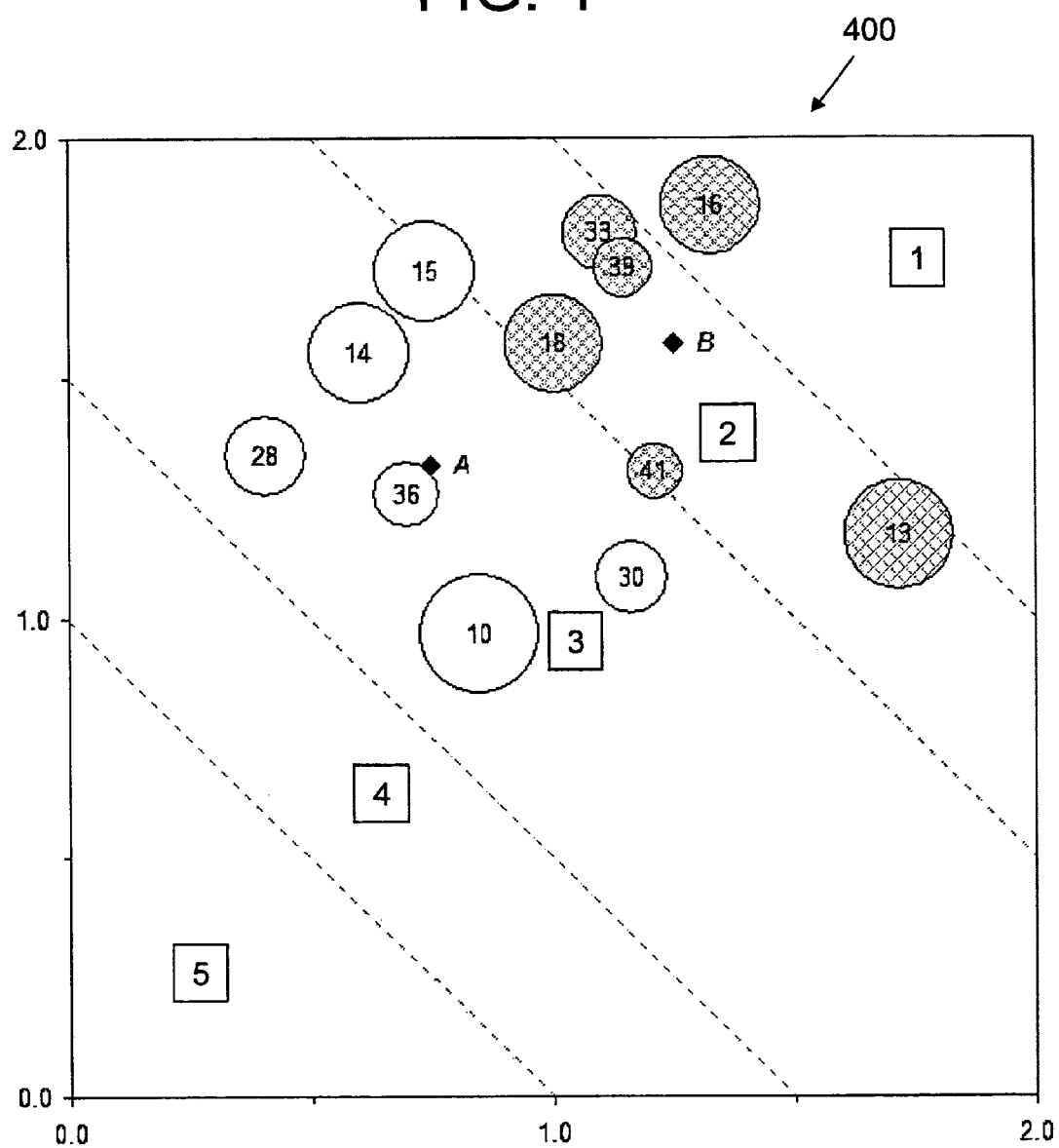
FIG. 4 is a calibrated model of the chart shown in FIG. 3, which has been calibrated using historical weights.

FIG. 4 illustrates a calibrated model 400 for the same cases as the previous uncalibrated model 300 shown in FIG. 3. Calibrated model 400 does a much better job of classifying these entities, despite at least one missing value on most cases, and more than a third of the variables missing values on some cases. Compensating weights apply, so no pairs or cases are excluded, and no statistics are substituted for missing values.

In this example, overall scores were computed as Manhattan distances, so boundaries between zones are parallel lines running diagonally from upper left to lower right. Alternatively, Euclidean distances would produce zones with concentric semicircles as boundaries. But neither Manhattan distances nor Euclidean distances define zones in terms of quadrants, as commonly used in business.

Again, centroids are marked as points A and B. Since the bubbles themselves are separated into zones, the centroids are further separated, too.

In addition to separation of bubbles into zones, the calibrated model also shows greater dispersion of bubbles within zones. Bubbles #10 and #15, for instance, can now be seen to differ substantially on the vertical dimension.

Sensitivity and Tuning

During calibration of a model, sensitivity analysis can be done two ways: Either cases or independent variables can be held out one at a time. (Using a separate control group is typically impractical because the collection size is too small.) If excluding one case substantially decreases correct classification, that case should be re-examined for erroneous values. Likewise, if excluding one variable substantially decreases correct classification, that variable may be one where missing values should be limited, if not eliminated.

Missing values are often replaced over time with valid values, and valid values themselves may be revised due to new information. When such changes occur on variables with large weights, bubbles may move large distances, including over zone boundaries. The direction and speed of those movements can be useful in predicting future classification. For instance, during the early stages of products or projects, it may become evident that there tends to be an optimistic bias in the data. If so, cases near a zone boundary may be viewed more cautiously.

An additional enhancement to the model may therefore be to establish a guard band between zones. Cases falling in the guard band are then considered only tentatively classified. The guard band can also be incorporated into the computation of weights so that the optimizer tries to move cases out of the guard band in order to improve classification.

Thus, the best solution often is the result of optimizing a hierarchy of objectives. For example, the primary objective is to maximize the percent of cases correctly classified. But once that objective is satisfied, minimizing cases in the guard band may be the next priority. Finally, maximizing the spread of cases within each zone may be the final priority. This set of hierarchical objectives was used on the model shown in FIG. 4.

Recalibration

As additional cases are added, or values for existing cases change, it is often desirable to recalibrate a model to maintain its ability to correctly classify entities. For instance, as the actual value of the dependent variable becomes known for cases where it had previously just been predicted, adding those cases into the collection used to recalibrate the model can improve the ability of the model to correctly classify future cases.

Over time, however, it may also be desirable to retire the least relevant cases. For example, a stable brand should be able to rely on cases much older than those associated with a fad. Nevertheless, the least relevant cases aren't necessarily the older ones. For instance, if corporate strategy dictates an exit from some markets and entry into others, the least relevant cases can be quite recent. Thus, if cases are retired, small collections of high-valued entities don't necessarily become large collections.

System

Figure 5:
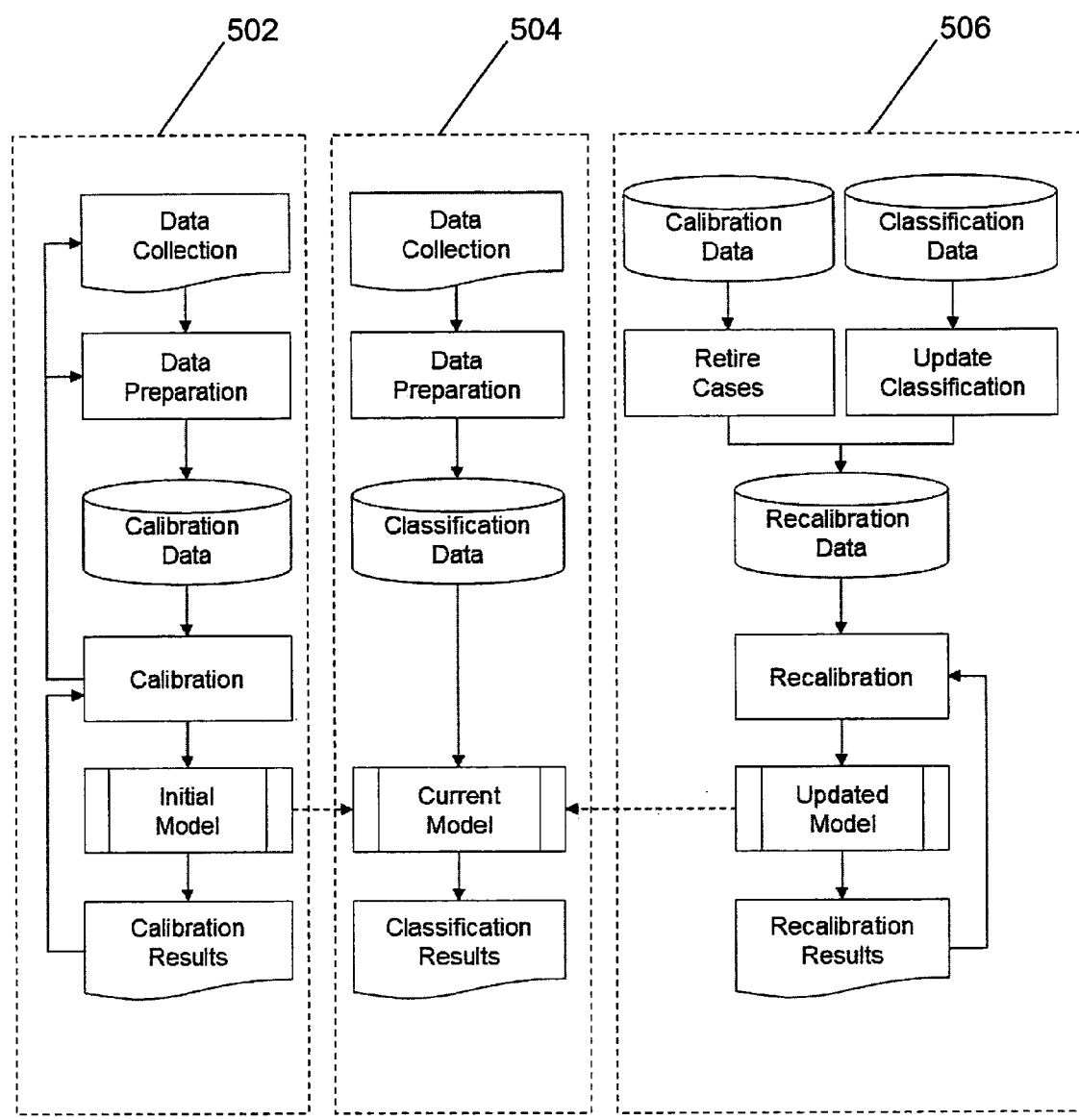
FIG. 5 depicts components of the overall system used by the present invention.

The system is illustrated in FIG. 5, which is divided into three vertical bands. Those bands cover calibration, classification, and recalibration.

Calibration

During calibration (shown as band 502), data is collected and prepared, then calibration generates weights. The initial model is run using those weights, and calibration results are generated. If the model does not correctly classify cases in the calibration data (for which the true value of the dependent variable is known), data collection and/or preparation may be adjusted. Likewise, the calibration itself may be adjusted by altering constraints and/or the hierarchy of objectives. When the initial model is sufficiently accurate, it becomes the current model.

Classification

During classification (shown as band 504), data is collected and prepared in the same manner as before, except the true values of the dependent variable are unknown. The current model is run using the weights determined during calibration (or recalibration), and the classification results predict the value of the dependent variable. That is, the model classifies small collections of high-value entities with missing values.

Recalibration

During recalibration (shown as band 506), old cases may be retired from the calibration data, and new cases added from the classification data by updating their true values on the dependent variable. The recalibration data is then used to generate updated weights, the updated model is run using those weights, and recalibration results are generated. If the model does not correctly classify cases in the recalibration data, the recalibration is adjusted by altering constraints and/or the hierarchy of objectives. When the updated model is sufficiently accurate, it becomes the current model.

Figure 6:
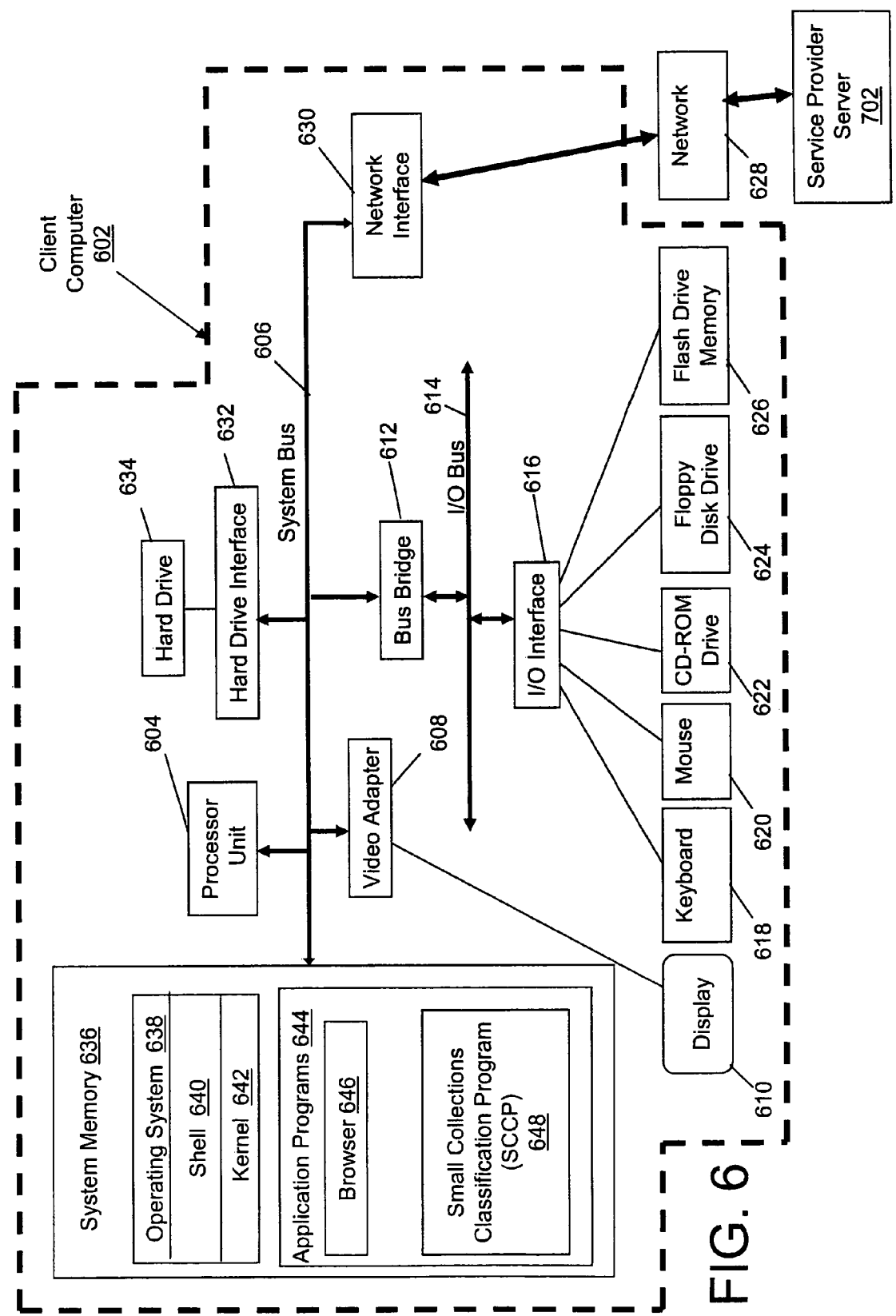
FIG. 6 illustrates an exemplary computer in which the present invention may implemented.

With reference now to FIG. 6, there is depicted a block diagram of an exemplary client computer 602, in which the present invention may be utilized. Client computer 602 includes a processor unit 604 that is coupled to a system bus 606. A video adapter 608, which drives/supports a display 610, is also coupled to system bus 606. System bus 606 is coupled via a bus bridge 612 to an Input/Output (I/O) bus 614. An I/O interface 616 is coupled to I/O bus 614. I/O interface 616 affords communication with various I/O devices, including a keyboard 618, a mouse 620, a Compact Disk—Read Only Memory (CD-ROM) drive 622, a floppy disk drive 624, and a flash drive memory 626. The format of the ports connected to I/O interface 616 may be any known to those skilled in the art of computer architecture, including but not limited to Universal Serial Bus (USB) ports.

Client computer 602 is able to communicate with a service provider server 702 via a network 628 using a network interface 630, which is coupled to system bus 606. Network 628 may be an external network such as the Internet, or an internal network such as an Ethernet or a Virtual Private Network (VPN).

A hard drive interface 632 is also coupled to system bus 606. Hard drive interface 632 interfaces with a hard drive 634. In a preferred embodiment, hard drive 634 populates a system memory 636, which is also coupled to system bus 606. Data that populates system memory 636 includes client computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present invention will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a browser 646. Browser 646 includes program modules and instructions enabling a World Wide Web (WWW) client (i.e., client computer 602) to send and receive network messages to the Internet using HyperText Transfer Protocol (HTTP) messaging, thus enabling communication with service provider server 702.

Application programs 644 in client computer 602's system memory also include a Small Collections Classification Program (SCCP) 648. SCCP 648 includes code for implementing the processes described in FIGS. 1-5. In one embodiment, client computer 602 is able to download SCCP 648 from service provider server 702.

The hardware elements depicted in client computer 602 are not intended to be exhaustive, but rather are representative to highlight essential components required by the present invention. For instance, client computer 602 may include alternate memory storage devices such as magnetic cassettes, Digital Versatile Disks (DVDs), Bernoulli cartridges, and the like. These and other variations are intended to be within the spirit and scope of the present invention.

Figure 7:
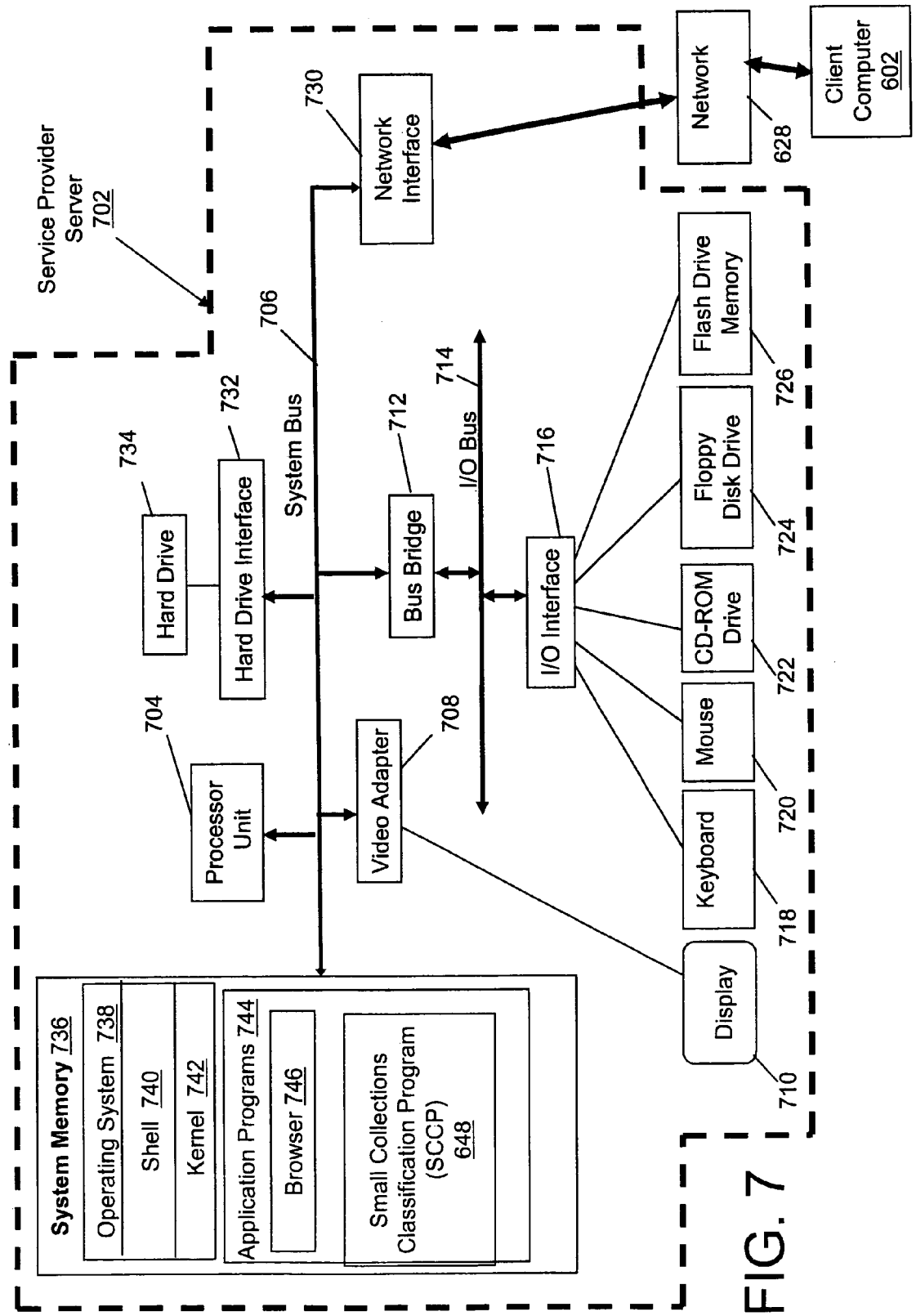
FIG. 7 depicts an exemplary server from which software for executing the present invention may be deployed.

As noted above, SCCP 648 can be downloaded to client computer 702 from service provider server 702, shown in exemplary form in FIG. 7. Service provider server 702 includes a processor unit 704 that is coupled to a system bus 706. A video adapter 708 is also coupled to system bus 706. Video adapter 708 drives/supports a display 710. System bus 706 is coupled via a bus bridge 712 to an Input/Output (I/O) bus 714. An I/O interface 716 is coupled to I/O bus 714. I/O interface 716 affords communication with various I/O devices, including a keyboard 718, a mouse 720, a Compact Disk—Read Only Memory (CD-ROM) drive 722, a floppy disk drive 724, and a flash drive memory 726. The format of the ports connected to I/O interface 716 may be any known to those skilled in the art of computer architecture, including but not limited to Universal Serial Bus (USB) ports.

Service provider server 702 is able to communicate with client computer 602 via network 628 using a network interface 730, which is coupled to system bus 706. Access to network 628 allows service provider server 702 to deploy SCCP 648 to client computer 602.

System bus 706 is also coupled to a hard drive interface 732, which interfaces with a hard drive 734. In a preferred embodiment, hard drive 734 populates a system memory 736, which is also coupled to system bus 706. Data that populates system memory 736 includes service provider server 702's operating system 738, which includes a shell 740 and a kernel 742. Shell 740 is incorporated in a higher level operating system layer and utilized for providing transparent user access to resources such as application programs 744, which include a browser 746, and a copy of SCCP 648 described above, which can be deployed to client computer 602.

The hardware elements depicted in service provider server 702 are not intended to be exhaustive, but rather are representative to highlight essential components required by the present invention. For instance, service provider server 702 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 702 performs all of the functions associated with the present invention (including execution of SCCP 648), thus freeing client computer 602 from having to use its own internal computing resources to execute SCCP 648.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the process described by the present invention, including the functions of SCCP 648 are performed by service provider server 702. Alternatively, SCCP 648 and the method described herein, and in particular as shown and described in FIGS. 1-5, can be deployed as a process software from service provider server 702 to client computer 602. Still more particularly, process software for the method so described may be deployed to service provider server 702 by another service provider server (not shown).

Figure 8A:
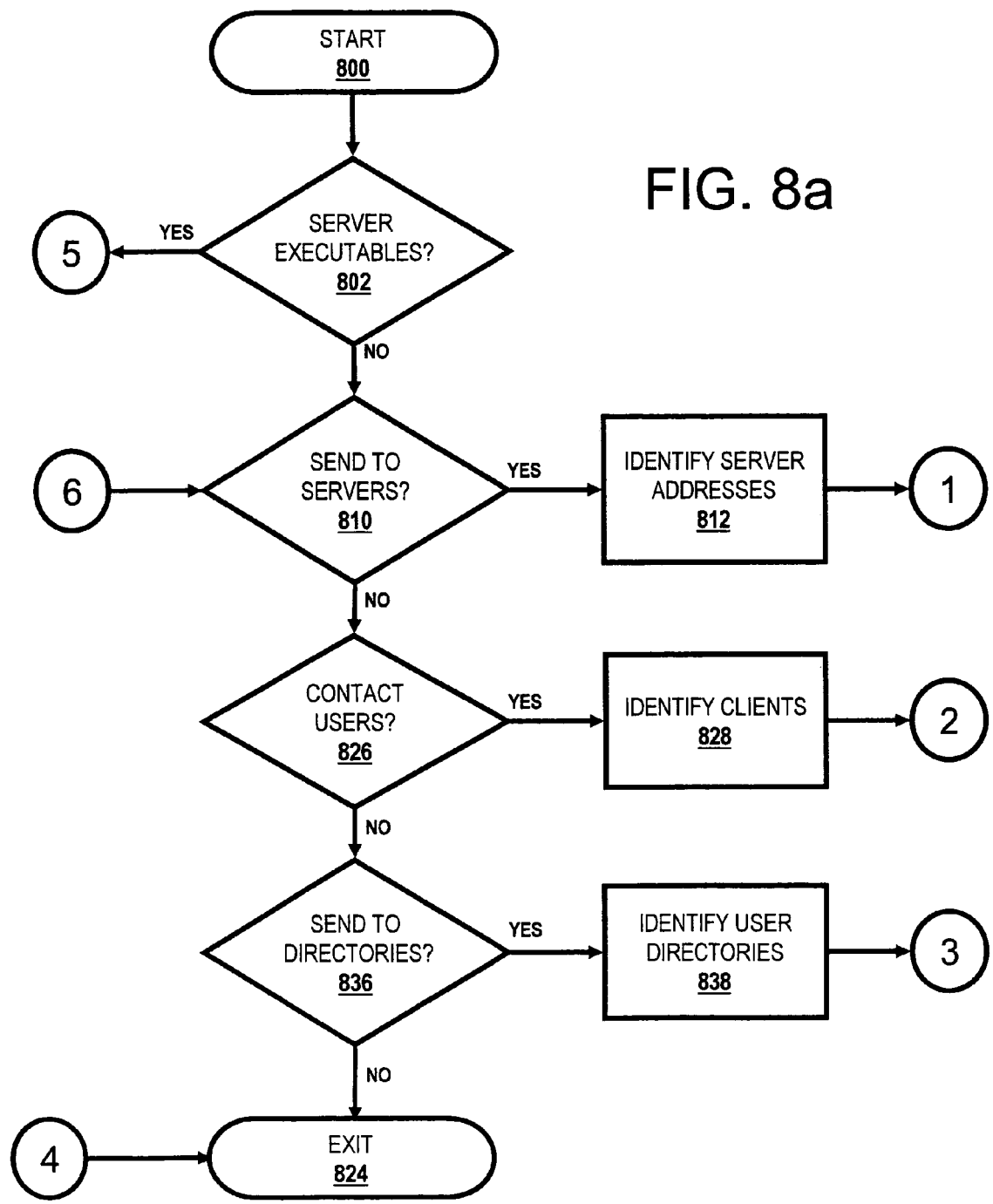

Referring then to FIG. 8, step 800 begins the deployment of the process software. The first thing is to determine if there are any programs that will reside on a server or servers when the process software is executed (query block 802). If this is the case, then the servers that will contain the executables are identified (block 804). The process software for the server or servers is transferred directly to the servers' storage via File Transfer Protocol (FTP) or some other protocol or by copying though the use of a shared file system (block 806). The process software is then installed on the servers (block 808).

Next, a determination is made on whether the process software is to be deployed by having users access the process software on a server or servers (query block 810). If the users are to access the process software on servers, then the server addresses that will store the process software are identified (block 812).

A determination is made if a proxy server is to be built (query block 814) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 816). The process software is sent to the servers either via a protocol such as FTP or it is copied directly from the source files to the server files via file sharing (block 818). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 820). Another embodiment is to have the servers automatically copy the process software to each client and then run the installation program for the process software at each client computer. The user executes the program that installs the process software on his client computer (block 822) then exits the process (terminator block 824).

In query step 826, a determination is made whether the process software is to be deployed by sending the process software to users via e-mail. The set of users where the process software will be deployed are identified together with the addresses of the user client computers (block 828). The process software is sent via e-mail to each of the users' client computers (block 830). The users then receive the e-mail (block 832) and then detach the process software from the e-mail to a directory on their client computers (block 834). The user executes the program that installs the process software on his client computer (block 822) then exits the process (terminator block 824).

Lastly a determination is made on whether to the process software will be sent directly to user directories on their client computers (query block 836). If so, the user directories are identified (block 838). The process software is transferred directly to the user's client computer directory (block 840). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 842). The user executes the program that installs the process software on his client computer (block 822) and then exits the process (terminator block 824).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 9A:
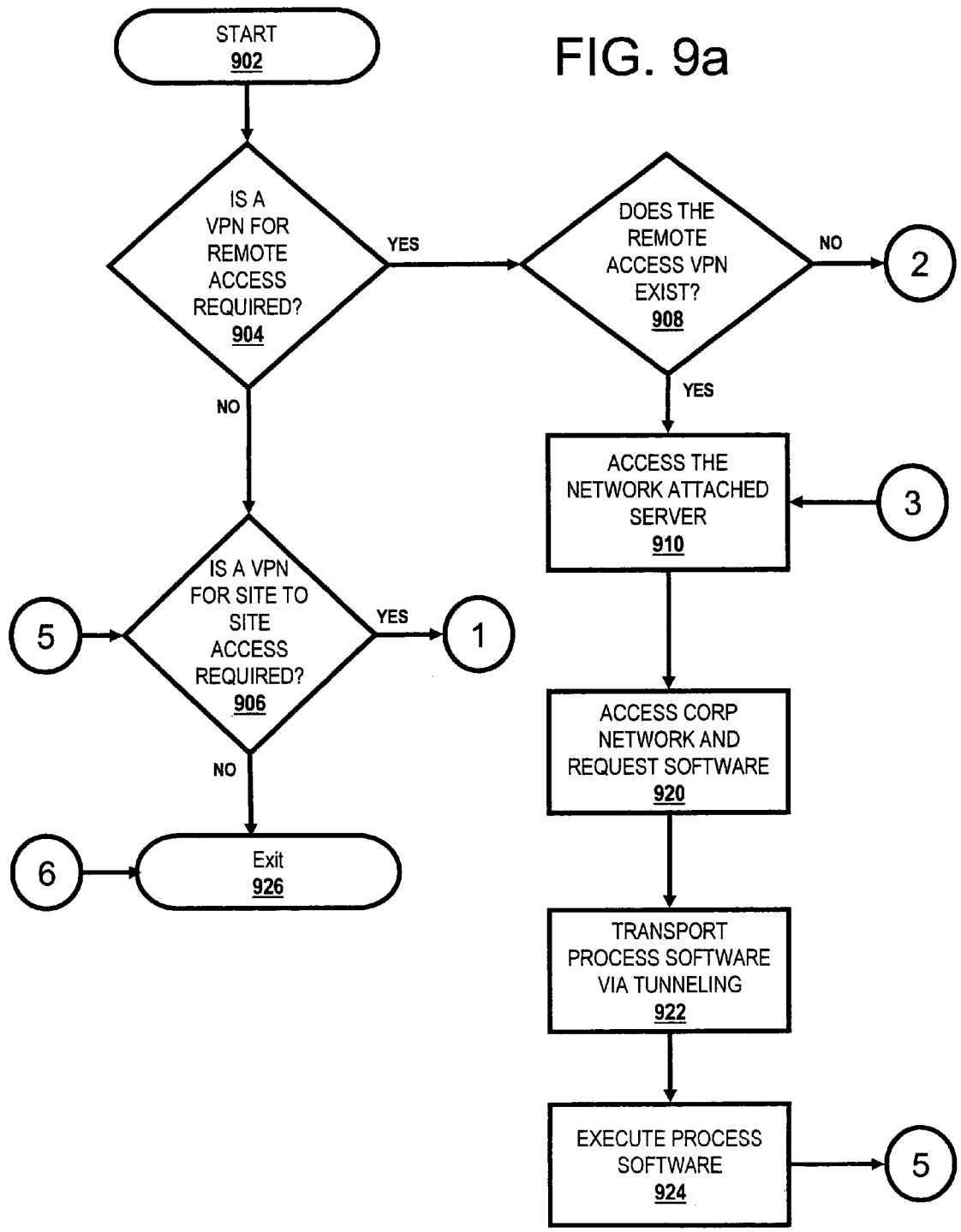
Figure 9C:
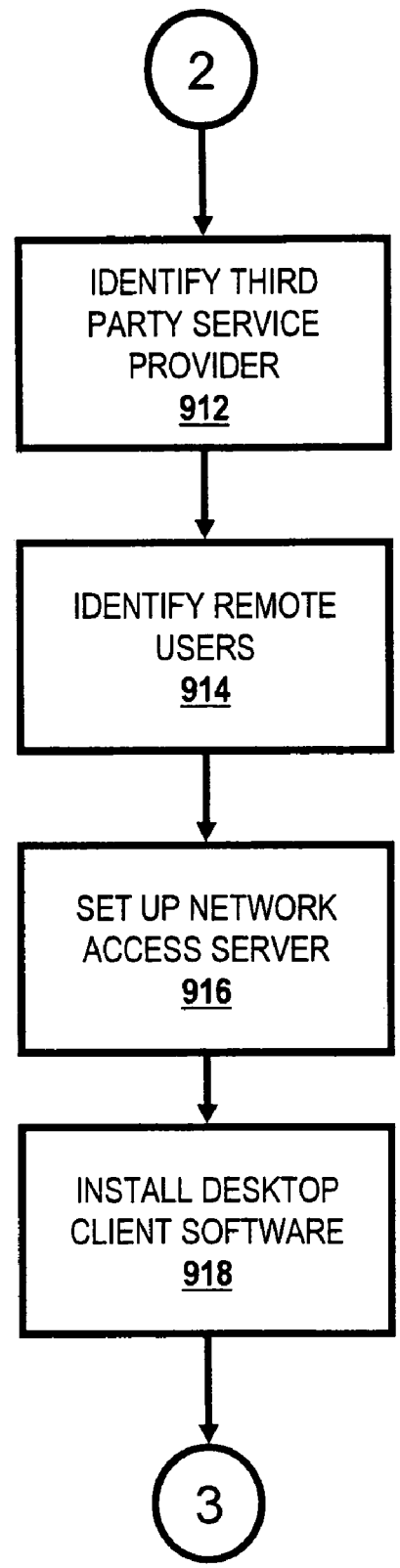

The process for such VPN deployment is described in FIG. 9. Initiator block 902 begins the Virtual Private Network (VPN) process. A determination is made to see if a VPN for remote access is required (query block 904). If it is not required, then proceed to (query block 906). If it is required, then determine if the remote access VPN exists (query block 908).

If a VPN does exist, then proceed to block 910. Otherwise identify a third party provider that will provide the secure, encrypted connections between the company's private network and the company's remote users (block 912). The company's remote users are identified (block 914). The third party provider then sets up a network access server (NAS) (block 916) that allows the remote users to dial a toll free number or attach directly via a broadband modem to access, download and install the desktop client software for the remote-access VPN (block 918).

After the remote access VPN has been built or if it been previously installed, the remote users can access the process software by dialing into the NAS or attaching directly via a cable or DSL modem into the NAS (block 910). This allows entry into the corporate network where the process software is accessed (block 920). The process software is transported to the remote user's desktop over the network via tunneling. That is the process software is divided into packets and each packet including the data and protocol is placed within another packet (block 922). When the process software arrives at the remote user's desk-top, it is removed from the packets, reconstituted and then is executed on the remote users desk-top (block 924).

A determination is then made to see if a VPN for site to site access is required (query block 906). If it is not required, then proceed to exit the process (terminator block 926). Otherwise, determine if the site to site VPN exists (query block 928). If it does exist, then proceed to block 930. Otherwise, install the dedicated equipment required to establish a site to site VPN (block 932). Then build the large scale encryption into the VPN (block 934).

After the site to site VPN has been built or if it had been previously established, the users access the process software via the VPN (block 930). The process software is transported to the site users over the network via tunneling (block 932). That is the process software is divided into packets and each packet including the data and protocol is placed within another packet (block 934). When the process software arrives at the remote user's desktop, it is removed from the packets, reconstituted and is executed on the site users desk-top (block 936). The process then ends at terminator block 926.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 10B:
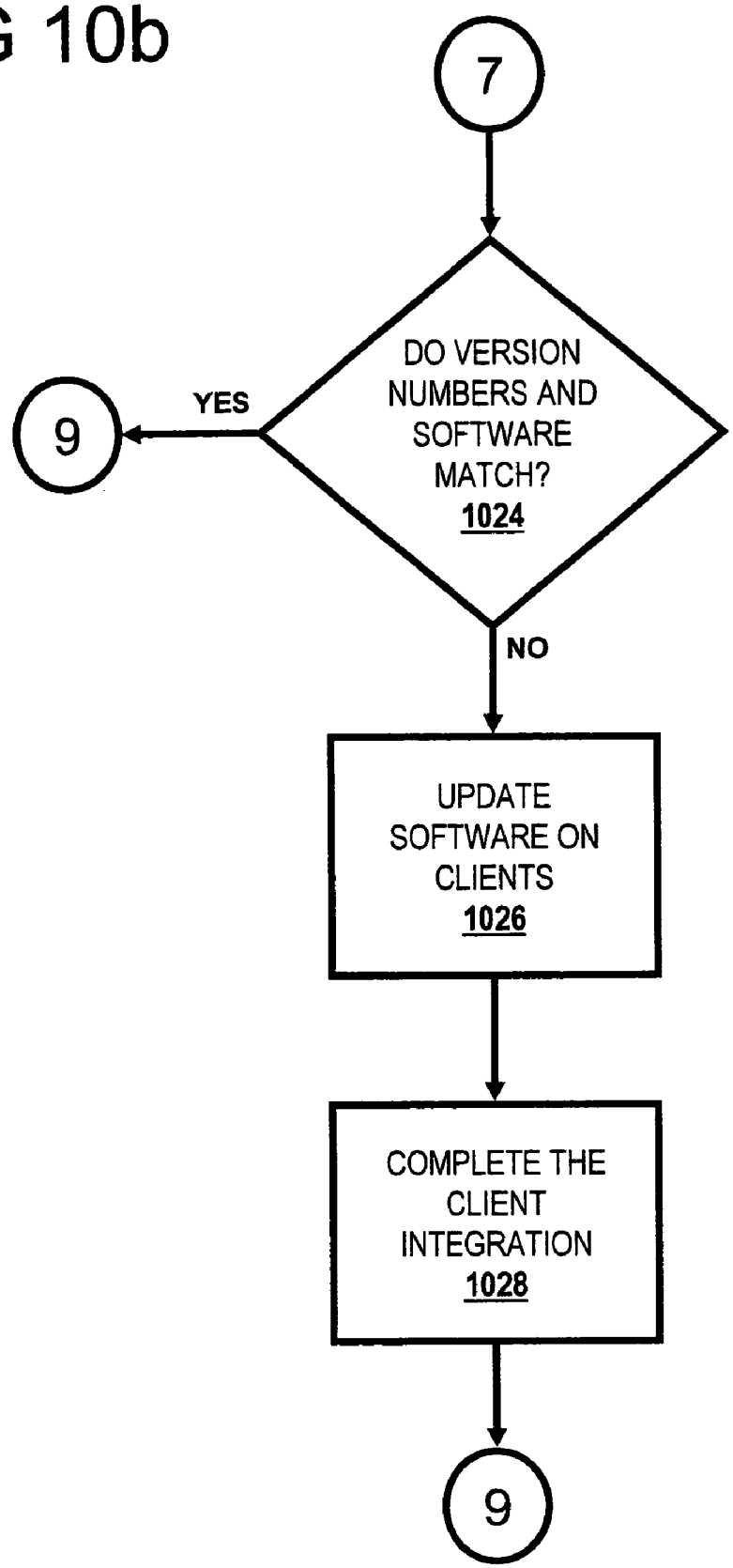

For a high-level description of this process, reference is now made to FIG. 10. Initiator block 1002 begins the integration of the process software. The first tiling is to determine if there are any process software programs that will execute on a server or servers (block 1004). If this is not the case, then integration proceeds to query block 1006. If this is the case, then the server addresses are identified (block 1008). The servers are checked to see if they contain software that includes the operating system (OS), applications, and network operating systems (NOS), together with their version numbers, which have been tested with the process software (block 1010). The servers are also checked to determine if there is any missing software that is required by the process software in block 1010.

A determination is made if the version numbers match the version numbers of OS, applications and NOS that have been tested with the process software (block 1012). If all of the versions match and there is no missing required software the integration continues in query block 1006.

If one or more of the version numbers do not match, then the unmatched versions are updated on the server or servers with the correct versions (block 1014). Additionally, if there is missing required software, then it is updated on the server or servers in the step shown in block 1014. The server integration is completed by installing the process software (block 1016).

The step shown in query block 1006, which follows either the steps shown in block 1004, 1012 or 1016 determines if there are any programs of the process software that will execute on the clients. If no process software programs execute on the clients the integration proceeds to terminator block 1018 and exits. If this not the case, then the client addresses are identified as shown in block 1020.

The clients are checked to see if they contain software that includes the operating system (OS), applications, and network operating systems (NOS), together with their version numbers, which have been tested with the process software (block 1022). The clients are also checked to determine if there is any missing software that is required by the process software in the step described by block 1022.

A determination is made is the version numbers match the version numbers of OS, applications and NOS that have been tested with the process software (query block 1024). If all of the versions match and there is no missing required software, then the integration proceeds to terminator block 1018 and exits.

If one or more of the version numbers do not match, then the unmatched versions are updated on the clients with the correct versions (block 1026). In addition, if there is missing required software then it is updated on the clients (also block 1026). The client integration is completed by installing the process software on the clients (block 1028). The integration proceeds to terminator block 1018 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 11A:
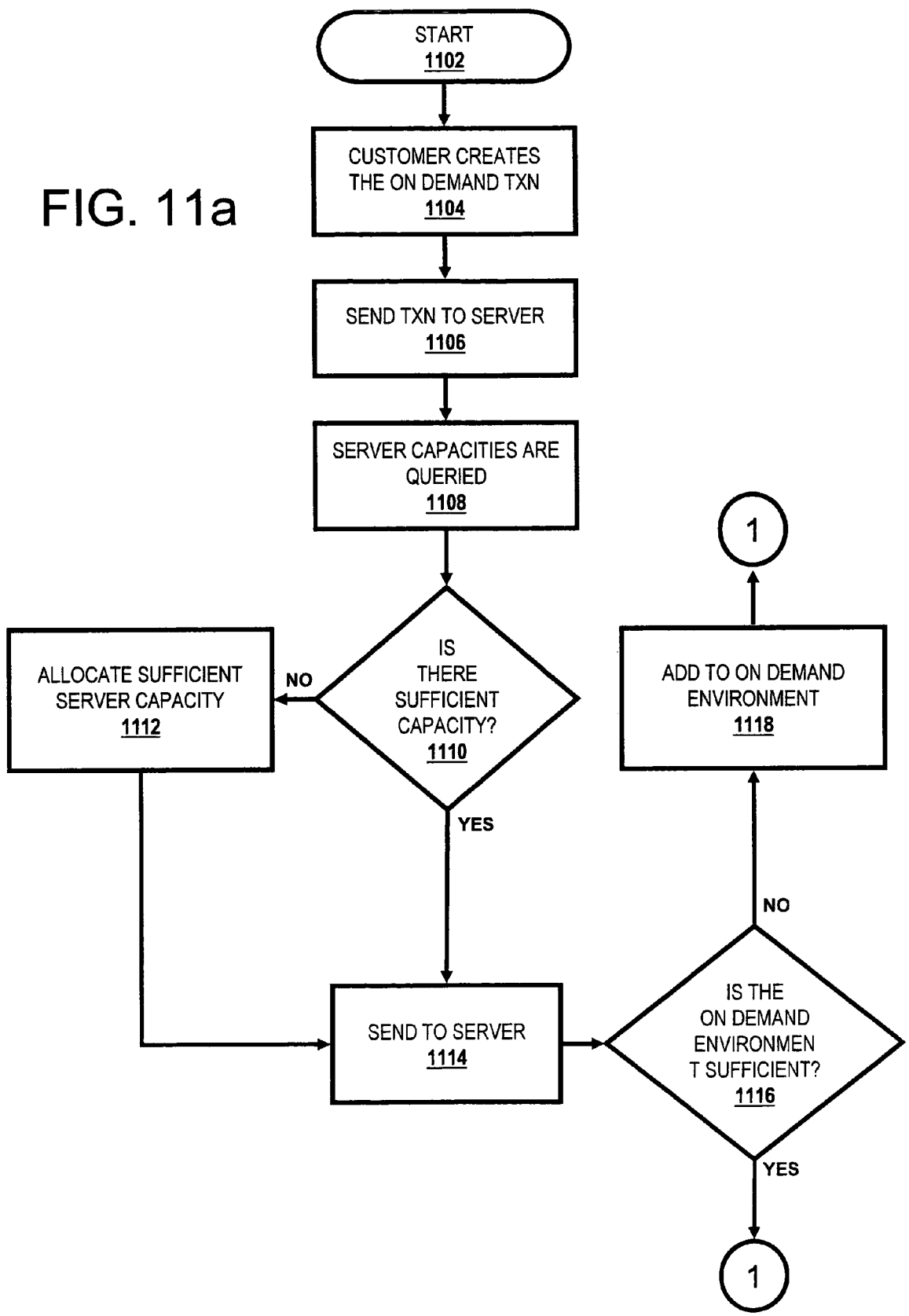
FIGS. 11a-b show a flow-chart showing steps taken to execute the steps shown and described in FIGS. 1-5 using an on-demand service provider.
Figure 11B:
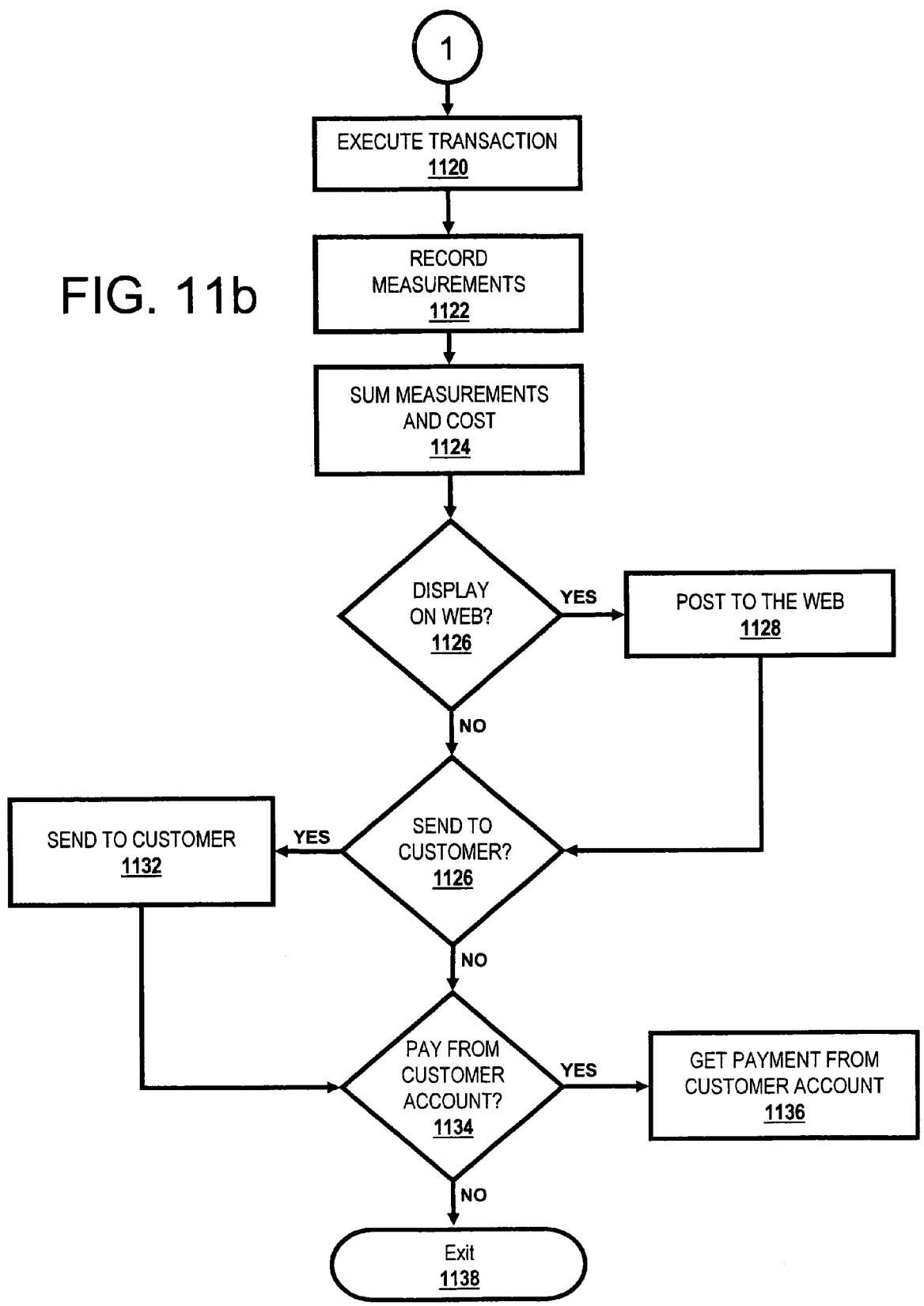

With reference now to FIG. 11, initiator block 1102 begins the On Demand process. A transaction is created than contains the unique customer identification, the requested service type and any service parameters that further, specify the type of service (block 1104). The transaction is then sent to the main server (block 1106). In an On Demand environment the main server can initially be the only server, then as capacity is consumed other servers are added to the On Demand environment.

The server central processing unit (CPU) capacities in the On Demand environment are queried (block 1108). The CPU requirement of the transaction is estimated, then the servers available CPU capacity in the On Demand environment are compared to the transaction CPU requirement to see if there is sufficient CPU available capacity in any server to process the transaction (query block 1110). If there is not sufficient server CPU available capacity, then additional server CPU capacity is allocated to process the transaction (block 1112). If there was already sufficient Available CPU capacity then the transaction is sent to a selected server (block 1114).

Before executing the transaction, a check is made of the remaining On Demand environment to determine if the environment has sufficient available capacity for processing the transaction. This environment capacity consists of such things as but not limited to network bandwidth, processor memory, storage etc. (block 1116). If there is not sufficient available capacity, then capacity will be added to the On Demand environment (block 1118). Next the required software to process the transaction is accessed, loaded into memory, then the transaction is executed (block 1120).

The usage measurements are recorded (block 1122). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1124).

If the customer has requested that the On Demand costs be posted to a web site (query block 1126), then they are posted (block 1128). If the customer has requested that the On Demand costs be sent via e-mail to a customer address (query block 1130), then these costs are sent to the customer (block 1132). If the customer has requested that the On Demand costs be paid directly from a customer account (query block 1134), then payment is received directly from the customer account (block 1136). The On Demand process is then exited at terminator block 1138.

The present invention uses weights computed from entities with known classifications to classify entities with unknown classifications. This invention is thus able to classify entities that cannot be classified with statistical methods or neural networks because this invention tolerates small sample size, missing data, and suppressor variables.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for classifying and displaying small collections of high-value entities that have missing data, wherein high-value entities are measurable items whose individual worth is substantial enough to justify classification even if a total number of the high-value entities is too small to attain statistical significance, the method comprising:

gathering available data about relevant attributes of high-value entities that are to be classified, wherein the relevant attributes include one dependent variable and multiple independent variables for each high-value entity, wherein the dependent variable identifies a particular high-value entity, and wherein the independent variables are values that represent answers to questions asked about the particular high-value entity;

preparing the available data, about each high-value entity, for analysis by:
validating values for the available data,
converting non-numeric values that make up the available data into numeric values, and
inverting scales as needed such that increases in each independent variable lead to increases in a correlating dependent variable;

computing a computed weight for each independent variable associated with the high-value entities, wherein the computed weight is set to zero for any independent variable that has missing values, and wherein the computed weight is increased above a standard baseline weight value for any independent variable that has no missing values;

scoring each high-value entity variable by multiplying each independent variable, of said each high-value entity, by the computed weight to create a score for every high-value entity;

classifying all high-value entities as cases that have a similar calibration score that is based on a) multiplying each independent variable by its computed weigh to create a weight product, b) summing the weight products for all independent variables into a score for each dependent variable, and c) calculating a combination of scores for each dependent variable to classify similar cases of high-value entities;

categorizing each high-value entity according to the calculated combination of scores for each dependent variable assigned to the entity; and representing all high-value entities as high-value entity representations in a calibrated visual model, wherein a newly classified high-value entity, which has missing data in its independent variables, is displayed in a graphical manner such that similarly scored high-value entities are represented in close proximity to one another.

2. The method of claim 1, wherein the calibrated visual model is divided and categorized into multiple zones, the method further comprising:

establishing a guard band between zones in the calibrated visual model, wherein high-value entities whose high-value entity representations fall in the guard band are considered to be only tentatively classified, and wherein the initial position of a high-value entity representation relative to a guard band is incorporated into the step of computing weighting factors computation of weights such that high-value entity representations are moved out of the guard band in order to improve zone classification of the high-value entities.

3. The method of claim 1, wherein the high-value entities are selected from a group consisting of ultra-large-scale projects, unique projects, customer segments, product brands, market geographies, service types, legislation and regulations.

4. The method of claim 1, wherein the step of preparing the available data, about each high-value entity, for analysis further comprises transforming the values to reduce any severe non-normalities that are present.

5. The method of claim 1, wherein the step of preparing the available data, about each high-value entity, for analysis further comprises rescaling variables such that variable means and variance are approximately the same.

* * * * *